US012647356B2

(12) United States Patent
Barkai et al.

(10) Patent No.: US 12,647,356 B2
(45) Date of Patent: Jun. 2, 2026

(54) ADAPTIVE ROUTING WITH ENDPOINT FEEDBACK

(71) Applicant: MELLANOX TECHNOLOGIES, LTD., Yokneam (IL)

(72) Inventors: Ofek Barkai, Petah Tikva (IL); Matty Kadosh, Hadera (IL); Omer Shabtai, Tel Aviv (IL); Masoud Moshref Javadi, Dearborn, MI (US); Brent David Schartung, Plano, TX (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 162 days.

(21) Appl. No.: 18/585,504

(22) Filed: Feb. 23, 2024

(65) Prior Publication Data

US 2025/0274380 A1      Aug. 28, 2025

(51) Int. Cl.
*H04L 45/00*          (2022.01)
*H04L 45/12*          (2022.01)
*H04L 45/121*         (2022.01)

(52) U.S. Cl.
CPC .......... *H04L 45/566* (2013.01); *H04L 45/121* (2013.01); *H04L 45/123* (2013.01)

(58) Field of Classification Search
CPC .... H04L 45/121; H04L 45/123; H04L 45/566
See application file for complete search history.

(56) References Cited

U.S. PATENT DOCUMENTS

| | | | | |
|---|---|---|---|---|
| 7,596,096 | B2 * | 9/2009 | Crawford ................ | H04L 45/36 370/254 |
| 7,706,411 | B2 * | 4/2010 | Wakumoto .............. | H04L 45/28 370/389 |
| 8,427,958 | B2 * | 4/2013 | Ko ...................... | H04L 43/0864 370/389 |
| 9,264,341 | B2 * | 2/2016 | Ma ......................... | H04L 45/124 |
| 9,360,885 | B2 * | 6/2016 | Ilyas ........................ | G06F 1/12 |
| 9,893,874 | B2 * | 2/2018 | Ilyas ................... | H04L 43/0852 |
| 9,954,751 | B2 * | 4/2018 | Zhang ................ | H04L 43/0864 |
| 10,298,491 | B2 * | 5/2019 | Kumar ................... | H04L 45/26 |
| 11,050,652 | B2 * | 6/2021 | Raindel ................ | H04L 43/106 |
| 12,212,502 | B2 * | 1/2025 | Debbage ................ | H04L 45/24 |
| 2010/0247094 | A1 * | 9/2010 | Young ................... | H04L 45/243 398/25 |
| 2011/0019669 | A1 * | 1/2011 | Ma ........................ | H04L 45/124 370/389 |

(Continued)

OTHER PUBLICATIONS

Chunduri et al. "Preferred Path Routing—A Next-Generation Routing Framework Beyond Segment Routing," IEEE, 2018 IEEE Global Communications Conference (GLOBECOM), Dec. 2018, 7 pages.

*Primary Examiner* — G. C. Neurauter, Jr.

(74) *Attorney, Agent, or Firm* — Sheridan Ross PC

(57)          ABSTRACT

Systems, switches, network endpoints, and methods are provided. In one example, a system is described that includes a latency measurement circuit to measure traffic on a network from an endpoint sender to an endpoint receiver across multiple paths. The system also includes a packet marking circuit to provide a routing mark for a packet destined for the endpoint receiver according to a network traffic measurement provided by the latency measurement circuit, where the routing mark provides an indication that supports routing for the packet to reach the endpoint receiver via a chosen path or subset of paths among the multiple paths.

20 Claims, 6 Drawing Sheets

(56) References Cited

U.S. PATENT DOCUMENTS

| | | | |
|---|---|---|---|
| 2021/0234789 A1* | 7/2021 | Meredith | H04L 45/12 |
| 2023/0076842 A1* | 3/2023 | Panesar | H04L 45/24 |
| 2023/0362083 A1* | 11/2023 | Billor | H04L 45/24 |
| 2024/0214312 A1* | 6/2024 | Ji | H04L 45/66 |
| 2025/0007813 A1* | 1/2025 | Bothe | H04L 43/12 |

* cited by examiner

500

504
Begin Network Probe

508
Generate One Or More
Probe Packets

512
Transmit Probe Packet(s) To Receiver
Across Multiple Paths In Network

516
Receive Probe Packet(s) That
Reached Receiver And Returned

520
Determine Travel Time Associated
With Each Returned Probe Packet(s)

524
Identify Preferred Path(s) And/Or Path(s) To Avoid Based On
Travel Time Associated With Each Probe Packet(s)

600

Identify At Least One Path Between Sender And Receiver As A Path To Avoid ⌐ 604

Continue Measuring Latency Associated With Path To Avoid ⌐ 608

Determine, With A Probe Packet, That Path Latency Is Back Within Acceptable Limits ⌐ 612

Notify Packet Marking Circuit That Path Is No Longer Required To Be Avoided ⌐ 616

ADAPTIVE ROUTING WITH ENDPOINT FEEDBACK

FIELD OF THE DISCLOSURE

The present disclosure is generally directed toward networking and, in particular, toward networking devices and methods of operating the same.

BACKGROUND

Switches and similar network devices represent a core component of many communication, security, and computing networks. Switches are often used to connect multiple devices to form networks.

Devices including but not limited to personal computers, servers, and other types of computing devices, may be interconnected using network devices such as switches. Such interconnected entities may form a network enabling data communication and resource sharing among the nodes. Often multiple potential paths for data flow may exist between any pair of devices. This feature allows data to traverse different routes from a source device to a destination device. Such a network design enhances the robustness and flexibility of data communication as it provides alternatives in case of path failure, congestion, or other adverse conditions. Moreover, such a network design facilitates load balancing across the network, optimizing the overall network performance and efficiency.

BRIEF SUMMARY

In accordance with one or more embodiments described herein, a computing system, which may include a switch or multiple switches, is described. According to at least some embodiments, the problem of adaptive routing in the presence of mixed traffic and asymmetry due to link failures is addressed. Specifically, network routing in a data center for Ethernet Remote Direct Memory Access (RDMA) flows where out-of-order arrival is acceptable. Current solutions are either targeted at InfiniBand and, therefore irrelevant, or use hash-based routing, which does not attempt to optimize routes or cannot solve remote routing congestion scenarios. Embodiments of the present disclosure provided herein describe a solution that is topology agnostic and able to deal with remote routing inefficiencies.

Embodiments of the present disclosure contemplate a solution with multiple components, some of which may be implemented on a switch and some of which may be implemented on a network endpoint (e.g., a sender node and/or receiver node). According to at least some embodiments, a switch is configured to mark packets with its routing decision. Alternatively or additionally, the sender node (e.g., network endpoint sending a packet or packet flow) may be configured to measure traffic performance to a receiver node across some or all available network paths. According to the measurements, the sender node may be configured to mark data packets (e.g., future data packets) with a decision indicating which path(s) are available for the switch to use for routing and/or which path(s) are to be avoided by the switch when routing to the receiver node. Upon receiving a marked packet, the switch may route the packet(s) of a packet flow according to the mark(s) on the packet.

As noted above, current solutions for making routing decisions allow either the switch or the host decide. Embodiments of the present disclosure contemplate a solution that combines both of the previous solutions, whereby the host can limit the switch options, thereby allowing the switch to make an educated decision for packet routing.

The combination of components described above allows for line rate adaptivity to both local and remote routing inefficiencies, while being topology agnostic. Previous solutions either do not solve remote congestion scenarios or are tailored to a specific type of topology.

Example aspects of the present disclosure provide a network endpoint including: a network interface that provides connectivity to a network; a latency measurement circuit to measure traffic on the network from a sender to a receiver across multiple paths; and a packet marking circuit to provide a routing mark for a packet destined for the receiver according to a network traffic measurement provided by the latency measurement circuit, where the routing mark provides an indication that supports routing for the packet to reach the receiver via a chosen path or subset of paths among the multiple paths.

In another illustrative example, a switch is described to include: a network interface that provides connectivity to a network; memory that stores information describing a plurality of routing groups available for routing a packet from the switch to an endpoint; and a routing circuit to receive a packet at the network interface, reference a routing mark for the packet destined for the endpoint, and route the packet to the endpoint via a routing group among the plurality of routing groups based on the routing mark, where the routing mark incorporates endpoint feedback received from another endpoint in the network and provides an indication that supports selection of the routing group.

In another example, a system is described to include: a latency measurement circuit to measure traffic on a network from an endpoint sender to an endpoint receiver across multiple paths; and a packet marking circuit to provide a routing mark for a packet destined for the endpoint receiver according to a network traffic measurement provided by the latency measurement circuit, where the routing mark provides an indication that supports routing for the packet to reach the endpoint receiver via a chosen path or subset of paths among the multiple paths Additional features and advantages are described herein and will be apparent from the following description and the figures.

BRIEF DESCRIPTION OF THE SEVERAL VIEWS OF THE DRAWINGS

The present disclosure is described in conjunction with the appended figures, which are not necessarily drawn to scale.

US 12,647,356 B2

3

Figure 6:
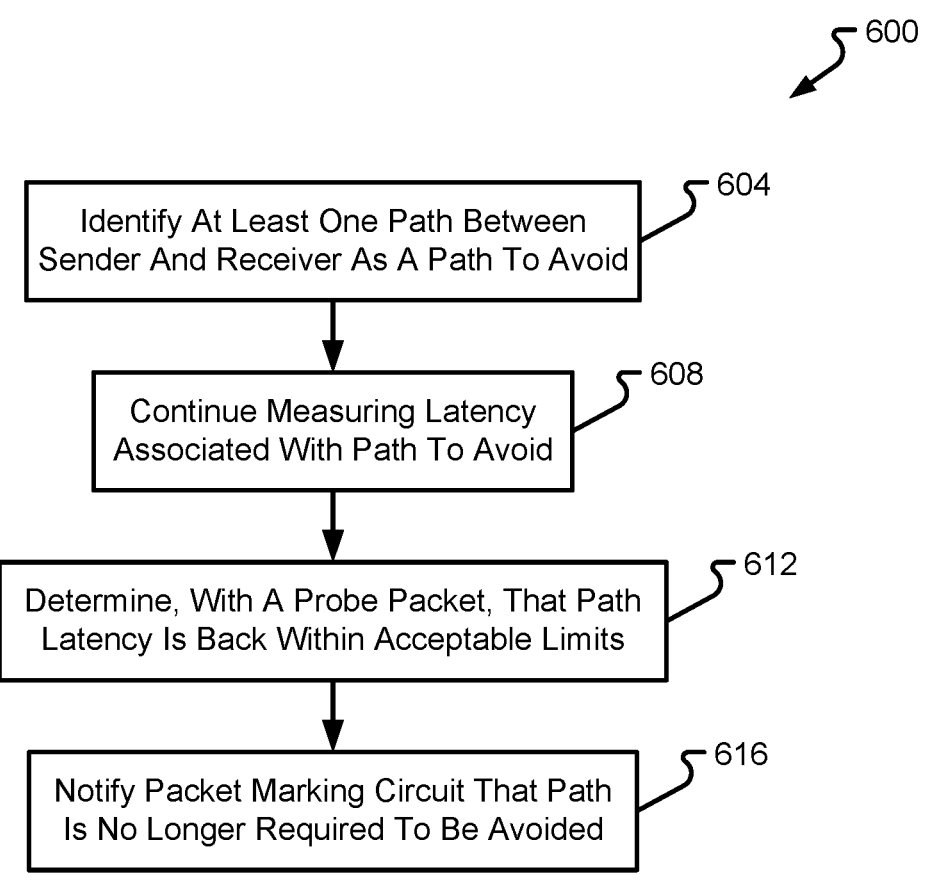

FIG. 6 is a flow diagram depicting a third method in accordance with at least some embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for routing packets between switches and nodes will be described. The concepts of packet routing depicted and described herein can be applied to the routing of information from one computing device to another. The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

Figure 1:
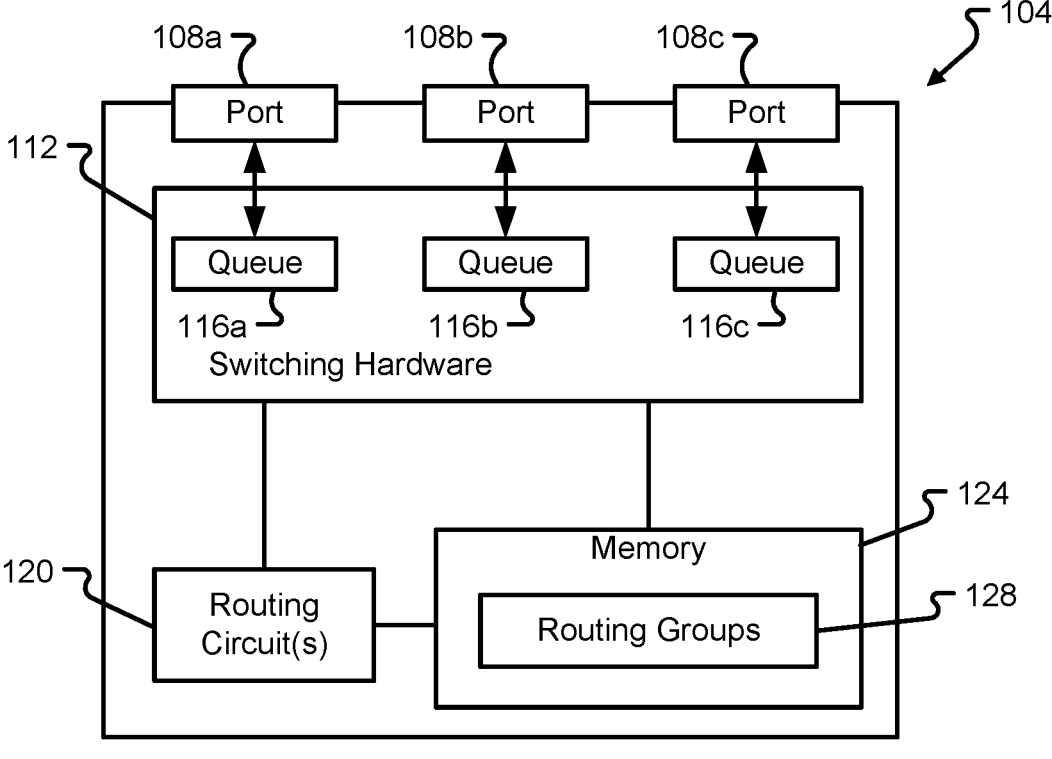
FIG. 1 is a block diagram depicting an illustrative configuration of switch in accordance with at least some embodiments of the present disclosure.
Figure 2:
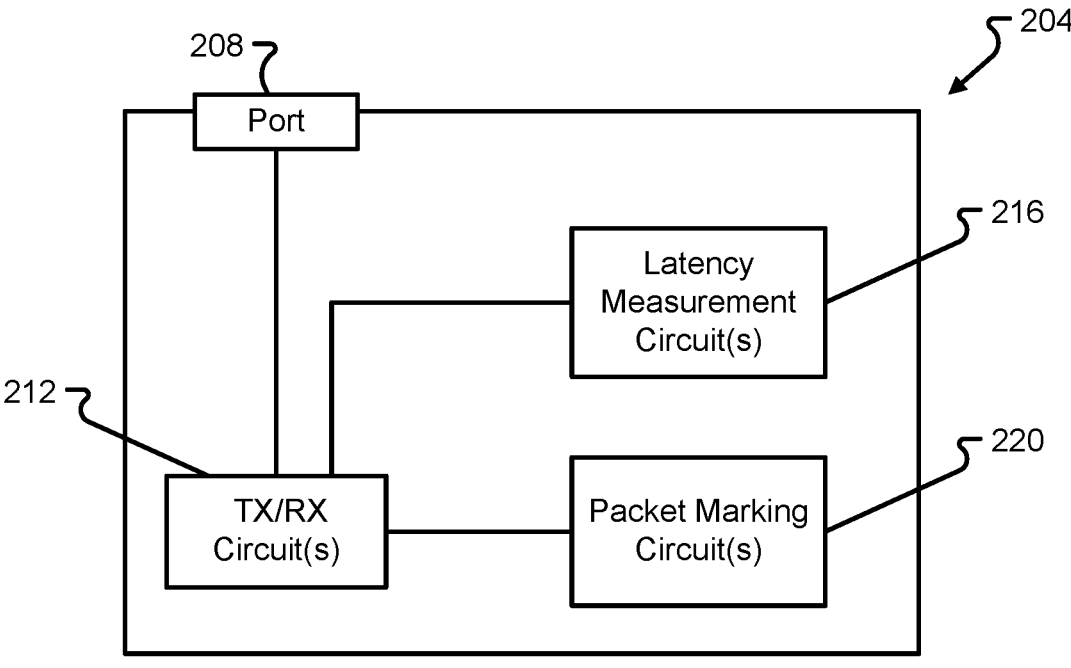
FIG. 2 is a block diagram depicting an illustrative configuration of a network endpoint in accordance with at least some embodiments of the present disclosure.
Figure 3:
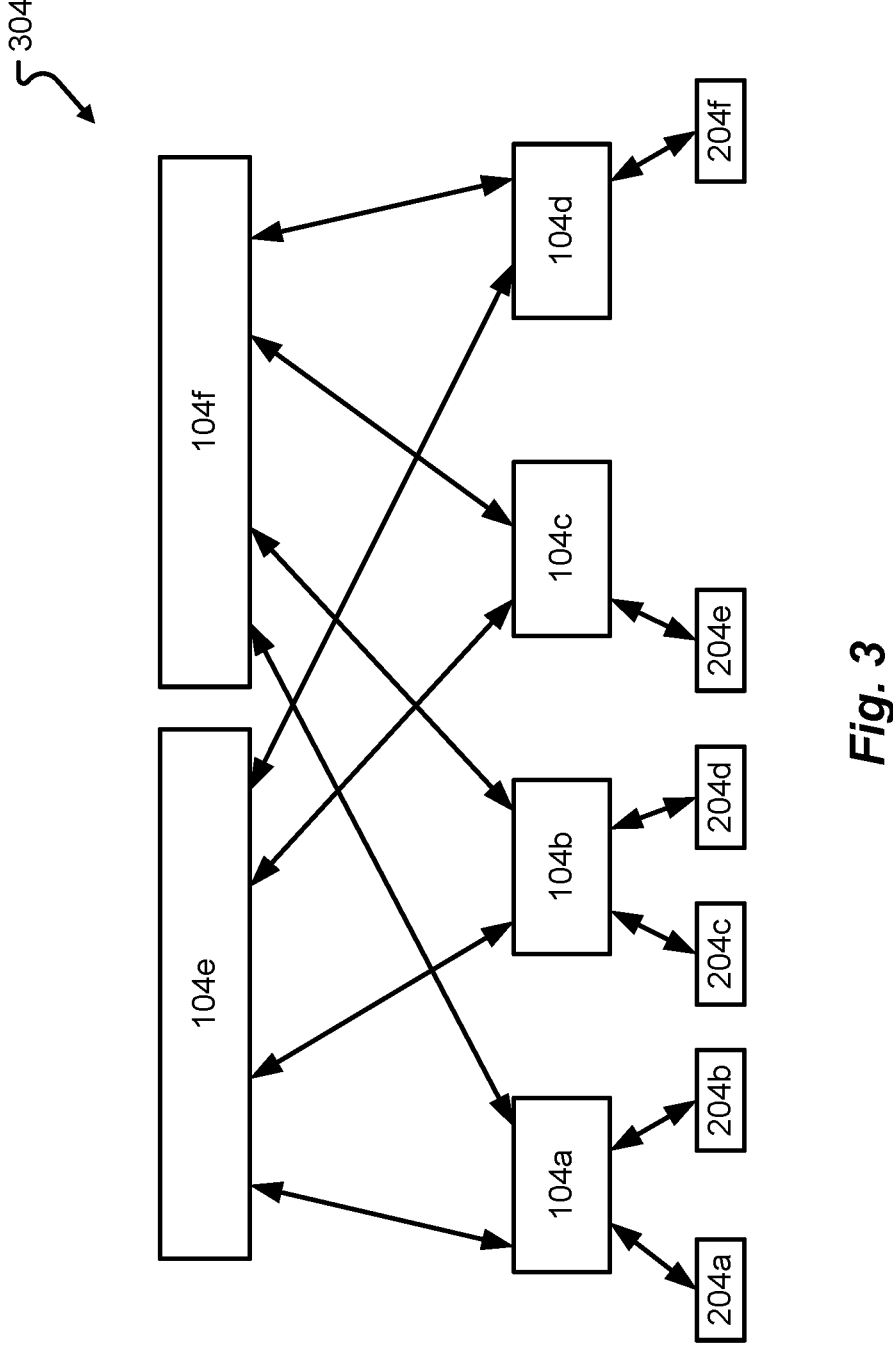
FIG. 3 illustrates a computing network in accordance with at least some embodiments of the present disclosure.

As illustrated in FIG. 1, a switch 104 as described herein may be a computing system comprising a number of ports 108*a-c* which may be used to interconnect with other switches 104 and/or computing systems, network endpoints, and network devices, which may be referred to as nodes, to make up a network. For example, and as illustrated in FIG. 3, a switch 104 may include spine switch 103*e*, 103*f* and/or a leaf switch 103*a-d* and may connect to other switches 104 and/or nodes 204*a-f*. Such a network 304 of switches 104 and nodes 204 may be useful in various settings, from data centers and cloud computing infrastructures to artificial intelligence systems.

Switches 104, as described in greater detail herein, may enable communication between other switches 104 and/or network endpoints 204. A switch 104 may be, for example, a switch, a network interface controller (NIC), or other device capable of receiving and sending data, and may act as a central node in the network. Switches 104 may be wired in a topology including spine switches, top-of-rack (TOR) switches, end-of-row (EoR) switches, and/or leaf switches, for example. The computing network 304 as shown in FIG. 3, may be configured in any type of suitable topology. As a non-limiting example, the computing network 304 may be configured to include a multi-layer switch topology, which may include one or multiple switches 104 connecting one or multiple network endpoints 204. Other non-limiting examples of network topologies that may be utilized in the computing network 304 include a dragonfly network, a two-level fat tree network, a three-level network, or the like.

Switches 104 may be capable of receiving, processing, and forwarding data, e.g., packets, to appropriate destinations within the network 304, such as other switches 104 and/or network endpoints 204. In some implementations, a switch 104 may be included in a switch box, a platform, or a case which may contain one or more switches 104 as well as one or more power supply devices and other components.

In some implementations, a switch 104 may comprise one or more ports 108*a-c* connected to one or more ports of other switches 104 and/or one or more ports 208 of other network endpoints 204. Although the switch 104 of FIG. 1 is illustrated to include three ports 108*ac*, it should be appreciated that a switch 104 may include greater or fewer ports than depicted. Processes, such as applications executed by network endpoints 204 may involve transmitting data to other network endpoints 204 of the network 304 via switches 104. Data may flow through the network 304 of switches 104 and network endpoints 204 using one or more protocols such as transmission control protocol (TCP), user datagram protocol (UDP), or Internet protocol (IP), for example. Each switch 104 may, upon receiving data from a network endpoint 204 or another switch 104, examine the data to identify a destination for the data and route the data through the network. Routing within the switch 104 may be implemented using a combination of switching hardware 112 and routing circuit(s) 120.

The switching hardware 112 and/or routing circuit(s) 120 may utilize information stored in memory 124 to support routing decisions. The switching hardware 112 may include a number of queues 116*a-c* to support packet flows into and out of the ports 108*a-c*, respectively. In some embodiments, the queues 116*a-c* may correspond to data buffers or the like that can be used to stage or collect packets or parts of packets when received at a port 108*a-c* and/or for transmission by a port 108*a-c*.

As will be described in further detail herein, information describing routing groups 128 may be stored in memory 124 and may be referenced by the switch 104 when making routing decisions for a packet. In some embodiments, data in the routing groups 128 may be populated based on network traffic measurements provided by a network endpoint 204. In this way, the switch 104 may be configured to route packets within the network 304 using data provided from a viewpoint of one or more network endpoints 204.

In accordance with at least some embodiments, data may be routed through the network 304 in routes or paths chosen, at least in part, based on network traffic measurements obtained by the network endpoints 204. For example, and as described in greater detail herein, a switch 104 may implement an adaptive routing mechanism whereby the switch 104 chooses a particular port 108*a-c* from which to forward a particular packet based on information received from a network endpoint 204. As a non-limiting example, the network endpoint 204 may be configured to measure traffic on the network 304 between a sender (e.g., a first network endpoint 204) and a receiver (e.g., a second network endpoint 204) across multiple paths. Based on the measured traffic, the network endpoint 204 may provide a routing mark for a packet that informs the switch 104 of a preferred or non-preferred path to use when transmitting the packet to a receiver. In other words, the routing mark provided in a packet by a network endpoint 204 may inform a switch 104 with an indication that supports routing for the packet to reach a receiver via a chosen path or subset of paths among a plurality of paths. As will be described, the routing mark may identify one or more network 304 paths to follow and/or one or more network 304 paths to avoid when routing the packet to a receiver.

A network endpoint 204 may utilize latency measurement circuit(s) 216 to generate and transmit probe packets to a receiver (e.g., another network endpoint 204 in the network 304). The receiver may then return the probe packet to the sender (e.g., the network endpoint 204 that transmitted the probe packet). Upon receiving the returned probe packet(s), the latency measurement circuit(s) 216 may determine which path(s) are preferred over other path(s) to send a packet to a receiver. Alternatively or additionally, the latency measurement circuit(s) 216 may determine which path(s) should be avoided when sending a packet to a receiver. This measurement information (e.g., preferred paths and/or non-preferred paths) may be provided to a transmit/receive (TX/RX) circuit(s) 212 (e.g., may be pushed to the TX/RX circuit(s) 212 or may be sent upon request by the TX/RX circuit(s) 212). The TX/RX circuit(s) 212 may then utilize packet marking circuit(s) 220 to mark one or more packets before such packets are transmitted to a receiver via port 208.

While some embodiments of the present disclosure will be described in connection with the latency measurement circuit(s) 216 measuring latency associated with a path, it should be appreciated that the latency measurement circuit(s) 216 may be configured to measure other performance metrics of path(s) between a sender and receiver. For example, the latency measurement circuit(s) 216 may be configured to measure one or more of latency, queuing delay, link utilization, combinations thereof, and the like, as part of measuring traffic on a path traversing the network 304. Thus, latency measurement circuit(s) 216 may be equipped to use a number of different pieces of metadata from the probe packets to determine which path(s) to follow and/or avoid.

In some embodiments, the packet marking circuit(s) 220 may be configured to provide a routing mark for a packet destined for a receiver according to a network traffic measurement provided by the latency measurement circuit(s) 216. The routing mark may provide an indication that supports routing decisions (e.g., to be made by one or more switches 104) for the packet to reach a receiver via a chosen path or subset of paths, among all possible paths between the sender and receiver. In some embodiments, the routing mark may positively define the chosen path or subset of paths (e.g., viable path options) for the packet to follow. Alternatively or additionally, the routing mark may define another path for the packet to avoid as the packet travels to the receiver. As will be appreciated, the path(s) or subset of paths may traverse one or multiple switches 104, meaning that the routing mark can be used by multiple switches 104 during routing of the packet to the receiver. As can be appreciated, different paths may traverse different switches 104 or may traverse common switches 104 using different ports 108 of the same switch 104. More specifically, two different paths from a sender to a receiver may traverse the same switches 104, but one path may use a first subset of ports 108 whereas another path may use a second, different, subset of ports 108. Port 108 selection 104 may be made by the switches 104 according to the routing mark(s) provided in the packet by the network endpoint 204.

Each network endpoint 204 may be or include a computing unit, such as a personal computer, a server, or other computing device, and may be responsible for executing applications and performing data processing tasks. Network endpoints 204 as described herein may range from servers in a data center to desktop computers in a network, or to devices such as internet of things (IoT) sensors and smart devices, as examples.

Each network endpoint 204 may, for example, include one or more processing circuits, such as graphics processing units (GPUs), central processing units (CPUs), data processing units (DPUs), application-specific integrated circuits (ASICs), field programmable gate arrays (FPGAs), or other circuit(s) capable of performing computations, as well as memory and storage resources to run software applications, handle data processing, and perform specific tasks as required. In some implementations, network endpoints 204 may also or alternatively include hardware such as GPUs for handling intensive tasks for machine learning, artificial intelligence (AI) workloads, or other complex processes.

For example, network endpoints 204 communicating via switches 104 may operate as a high-performance computing (HPC) cluster. A cluster of nodes or computing network 304 may comprise numerous interconnected servers, each equipped with CPUs and/or GPUs. The nodes may provide computational horsepower for, as an example, training large-scale AI models or running complex scientific simulations. For AI and machine learning tasks, the nodes may comprise one or more GPUs or other processing circuitry which may be capable of handling parallel processing requirements of neural networks and other applications.

Network endpoints 204 may be or include client devices which, for example, engage in AI-related, research-related, and other processor-intensive tasks, and utilize a network of switches 104 and other network endpoints 204 to handle the computational loads and data throughput required by such intensive applications. Such network endpoints 204 may include, for example, workstations and personal computers used by researchers, data scientists, and professionals for developing, testing, and running AI models and research simulations.

A switch 104 as described herein may in some implementations be as illustrated in FIG. 1. The ports 108*a-c* of a switch 104 may be capable of facilitating the transmission of data packets, or non-packetized data, into, out of, and through the switch 104. Such ports 108*a-c* may serve as interface points where network cables may be connected, connecting the switch 104 with other switches 104 and/or network endpoints 204.

Each port 108*a-c* may be capable of receiving incoming data packets from other devices and/or transmitting outgoing data packets to other devices. In some implementations, ports 108*a-c* may be configured to operate as either dedicated ingress or egress ports 108 or may be enabled to operate in a dual functionality capable of performing ingress and egress functions. For example, an egress port 108 may be used exclusively for sending data from the interconnect device and an ingress port 108 may be used solely for receiving incoming data into the switch.

Switching hardware 112 of a switch 104 may be capable of handling a received packet by determining a port 108 from which to send the packet and forwarding the packet from the determined port 108. As noted above, each port 108 of a switch 104 may be associated with one or more queues 116-*c*. When a packet, or data in any format, is to be sent from a port 108, the packet may be stored in a queue 116 associated with the port 108 until the port 108 is ready/available to send the packet.

In support of the functionality of the switching hardware 112, routing circuit(s) 120 may be configured to control aspects of the switching hardware 112 to adaptive routing in relation to packets. The routing circuit(s) 120 may include one or more processors or microprocessors and may in some implementations include a CPU, an ASIC, and/or other processing circuitry which may be capable of handling computations, decision-making, and management functions required for operation of the switch 104.

Routing circuit(s) 120 may be configured to handle management and control functions of the switch 104, such as managing routing groups 128, setting up tables, configuring ports 108, and otherwise managing operation of the switch 104. Routing circuit(s) 120 may execute software and/or firmware to configure and manage the switch 104, such as an operating system and management tools.

Memory 124 of a switch 104 as described herein may comprise one or more memory elements capable of storing configuration settings, routing groups 128, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats.

Referring to FIG. 3, each arrow may represent any number of one or more connections between the various elements or nodes. For example, ports of a first switch 104*a* may be connected to one or more ports of a second switch 104*e*, one or more ports of a third switch 104*f*, and one or more ports of each of nodes 204*a* and 204*b*. Each connection between a switch 104 and another switch 104 or network endpoint 204 may be used to carry multiple flows. Flows may also be static flows or adaptive routing flows. Static flows may be flows which cannot be rerouted via different routes through the network while adaptive routing flows may be flows which can be routed via a variety of different routes to reach the proper destination. As an example, each node 204*a-f* may transmit static flows and/or adaptive flows to other nodes 204*a-f* via the switches 104*a-f*.

As should be appreciated, the specific interconnections of the switches 104*a-f* and nodes 204*a-f* illustrated by FIG. 3 are provided for illustration purposes only and should not be considered as limiting in any way. While the network 304 illustrated in FIG. 3 only includes two layers of switches 104, it should be appreciated additional layers may be introduced and switches may be interconnected in any conceivable manner. For example, in some implementations, a network 304 as described herein may contain multiple switches 104 interconnected in a topology such as a Clos network or a fat tree topology network.

Figure 4:
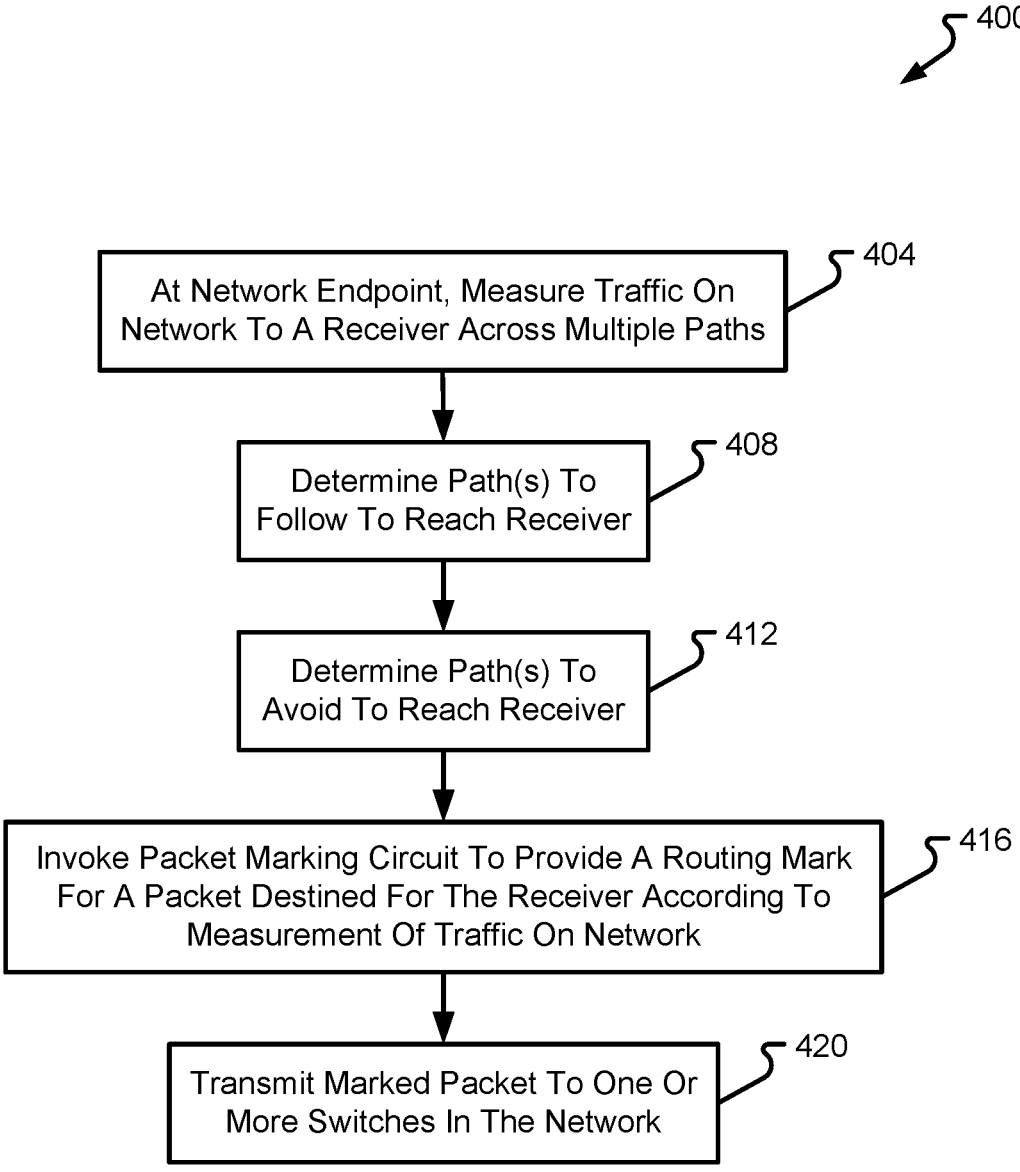
FIG. 4 is a flow diagram depicting a first method in accordance with at least some embodiments of the present disclosure.
Figure 5:
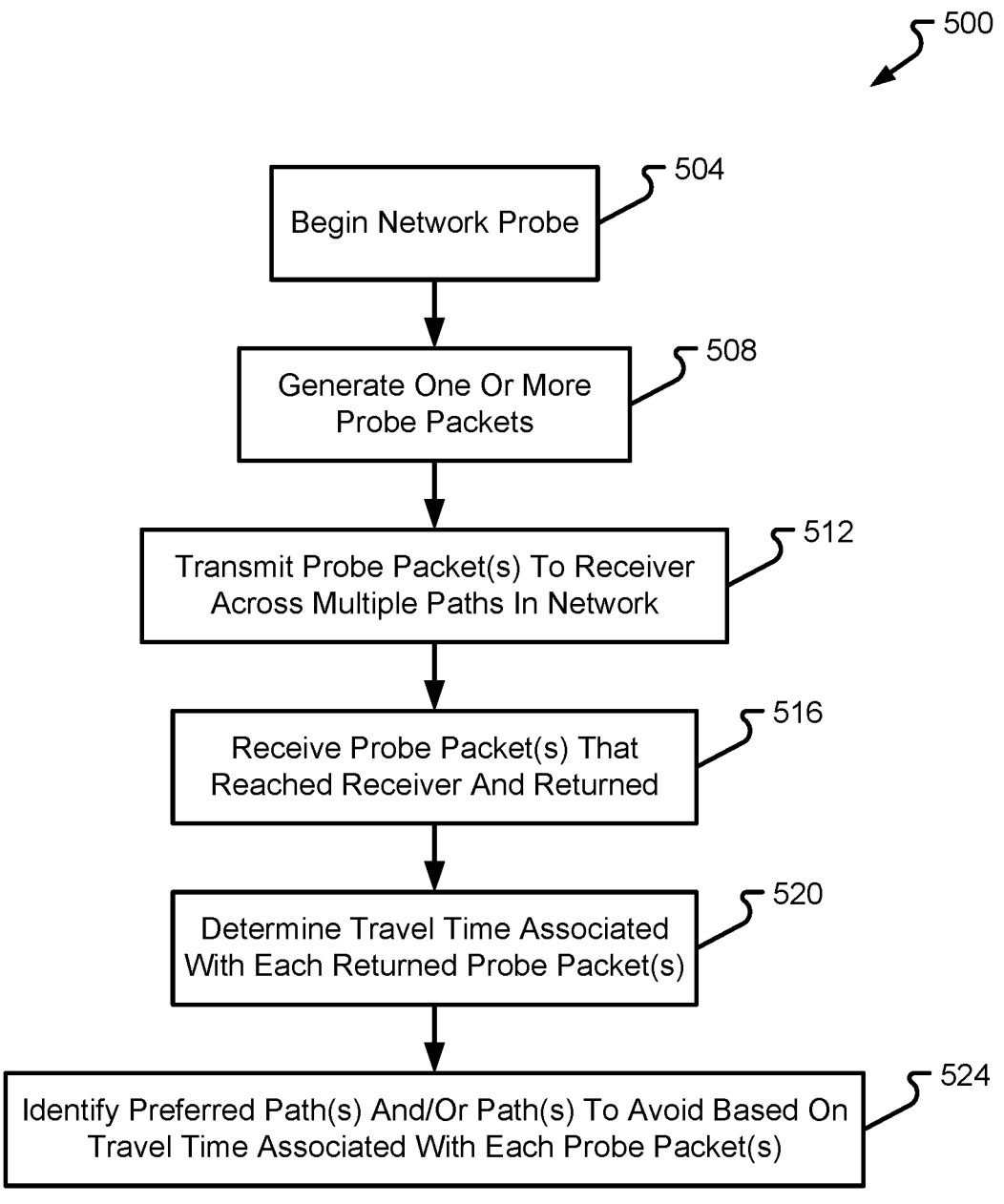
FIG. 5 is a flow diagram depicting a second method in accordance with at least some embodiments of the present disclosure.

Referring now to FIGS. 4-6, additional details and functions of the systems, networks, and devices will be described in accordance with at least some embodiments of the present disclosure. Various methods will be described with reference to particular elements. It should be appreciated that the steps of some methods may be incorporated into other methods and/or the order of steps of some methods may be changed without departing from the scope of the present disclosure. Additionally, while certain steps are described as being performed by one element, it should be appreciated that other elements may be configured to perform similar or identical steps without departing from the scope of the present disclosure.

With reference to FIG. 4, a first method 400 will be described in accordance with at least some embodiments of the present disclosure. Some or all steps of the method 400 may be performed at a network endpoint 204 using some or all components of a network endpoint 204 as depicted and described herein.

The method 400 begins with the network endpoint 204 utilizing its latency measurement circuit(s) 216 to measure traffic on a network 304 (step 404). As can be appreciated, the latency measurement circuit(s) 216 may utilize one or multiple probe packets to measure latency across one or multiple paths between the network endpoint 204 (e.g., the sender node invoking the latency measurement circuit(s) 216) and another network endpoint 204 (e.g., a receiver node that will receive the probe packet(s) and return the probe packet(s) to the sender node). In accordance with at least some embodiments, the network endpoint 204 that transmitted the probe packet(s), may receive response(s) to the probe packet(s), and determine latencies associated with each of the paths traversed by each of the probe packet(s). The latencies (e.g., travel duration associated with each of the probe packets) may be used to measure traffic on the network 304.

In some embodiments, and based at least in part on the measured traffic, the latency measurement circuit(s) 216 may determine one or more paths that a packet should follow to reach a receiver node (step 408). The method 400 may alternatively or additionally include a step where the latency measurement circuit(s) 216 determine one or more paths that a packet should avoid to successfully reach a receiver node (step 412). In some embodiments, if the latency measurement circuit(s) 216 determine that a probe packet among the plurality of probe packets traversed a network path in a duration exceeding one standard deviation of the average duration the other probe packets took to traverse the network 304, then the that particular network path may be identified as a network path to avoid, until the latency associated with that particular network path improves back toward the average duration.

It should be appreciated that other heuristics can be used as part of classifying a network path as a network path to avoid and/or as part of classifying a network path as a preferred network path. For example, and without limitation, any number of suitable heuristics can be used to classify paths, such as rule-based heuristics, statistic-based heuristics, and the like. Alternatively or additionally, advanced anomaly detection, clustering algorithms, and/or Artificial Intelligence (AI) models may be used to analyze data from probe packets and classify network paths as a preferred network path and/or network path to avoid.

Information regarding the traffic on the network 304 may be shared from the latency measurement circuit(s) 216 to the TX/RX circuit(s) 212 and/or packet marking circuit(s) 220. The method 400 may continue when it is desired to send a packet (e.g., a data packet) from the sender to the receiver. The method 400 may include the TX/RX circuit(s) 212 invoking the packet marking circuit(s) 220 to provide a routing mark for a packet (or multiple packets) destined for a receiver (step 416). The routing mark may provide an indication that supports routing for the packet(s) to reach the receiver via a chosen path or subset of paths among the multiple paths available to reach the receiver. It should be appreciated that the packet(s) may be associated with any suitable type of network flow. For instance, the packet(s) may be part of an RDMA packet flow that accepts out-of-order packets.

The method 400 may continue with the TX/RX circuit(s) 212 transmitting the marked packet(s) via its port 208 to the network 304 (step 420). As an example, and without limitation, the TX/RX circuit(s) 212 may transmit the marked packet to the receiver via one or multiple switches 104a-f. As the marked packet traverses the network 304, it may be received by one or more switches 104. Each switch 104 may be configured to utilize its routing circuit(s) 120 to reference a routing mark for the packet destined for the receiver. The switch 104 may also route the packet to the receiver via a routing group defined in its available routing groups 128 based on information contained in the routing mark. In some embodiments, the routing mark incorporates feedback from a network endpoint 204 and provides an indication that supports selection of an appropriate routing group to use or avoid when routing the packet to the receiver. In some embodiments, the identified routing group may exclude at least one switch 104 that is not excluded from another routing group in the plurality of routing groups 128. The routing group selected by the switch based on the routing mark may correspond to a chosen path or subset of paths from the switch 104 to the receiver, where the chosen path or subset of paths traverses a plurality of switches 104 including a ToR switch, an EoR switch, and/or a spine switch.

As a more specific, but non-limiting example, of the method 400, consider the network 304 where traffic is sent from network endpoint 204a under switch 104a to network endpoint 204c under switch 104b. The packet traffic between the network endpoints 204a, 204c may be routed via both switch 104c and/or switch 104f (e.g., via adaptive routing). Meanwhile, the network endpoint 204a may also utilize its latency measurement circuit(s) 216 to measure the traffic performance to network endpoint 204c for both/all possible paths.

When switch 104b sends traffic to network endpoint 204e via switch 104c (e.g., the spine switch), the measurement for switch 104e may degrade. In this situation, the network endpoint 204a will discover the network degradation and then update routing marks provided on packets sent to switch 104a, indicating to switch 104a that it should change packet routing (e.g., discontinue using port(s) 108 that lead to switch 104c. The routing marks provided by the network endpoint 204a may cause the switch 104a to update its routing groups 128 thereby changing the behavior of the switch 104a to discontinue use of switch 104c, meaning that switch 104f will be used to carry packets between network endpoint 204a and network endpoint 204c until performance of switch 104e improves.

In some embodiments, additional senders (e.g., network endpoint 204b) from switch 104a to other destinations will not have the same marks and will keep being routed to both switches 104e, 104f. Thus, when the network endpoint 204a determines that switch 104e is part of a less-preferred path to a receiver, then switch 104a will route packets from network endpoint 204a to the receiver in a way that avoids the less-preferred path whereas the switch 104a will continue to route packets from other network endpoints (e.g., network endpoint 204b) using both switch 104c and switch 104f, at least until network endpoint 204b also identifies a path flowing through switch 104e as being less-preferred compared to other paths.

Referring now to FIG. 5, additional details of a second method 500 will be described in accordance with at least some embodiments of the present disclosure. The method 500 may be performed in connection with method 400 (e.g., as part of measuring traffic on a network 304).

The method 500 begins with a network endpoint 204 utilizing the latency measurement circuit(s) 216 to begin a probe of network 304 (step 504). The latency measurement circuit(s) 216 may first generate one or more probe packets (step 508). The probe packets may be substantially similar to one another, but have different identifiers to enable a differentiation between responses to probe packets. Each probe packet may be transmitted by the network endpoint 204 to a receiver across multiple different paths in the network 304 (step 512).

Upon receiving the probe packet, the receiver may respond to the probe packet by returning the probe packet to the sender. The method 500 will continue as the latency measurement circuit(s) 216 of the sender receive responses to the various probe packets that were transmitted across the network 304 (step 516).

Each probe packet may provide information to the latency measurement circuit(s) 216 indicating a duration of time between the transmission of the probe packet and a receipt of the response to the probe packet. In some embodiments, the response to the probe packet may include information describing the duration between the time the probe packet was sent by the sender and the time the probe packet was received by the receiver. In some embodiments, the response to the probe packet may include information describing the duration between the time the probe packet was sent by the sender and the time the response to the probe packet was received by the sender. The responses to probe packets may re-trace their steps from the receiver back to the sender. In other embodiments, the responses to the probe packets may traverse a common path from the receiver back to the sender.

The method continues with the latency measurement circuit(s) 216 analyzing a travel duration associated with each of the plurality of probe packets to measure the traffic on the network 304 (step 520). Based on the travel duration of each probe packet, the latency measurement circuit(s) 216 identify preferred path(s) and/or path(s) to avoid when sending packets to the receiver (step 524). The information describing such path preferences can then be shared with the TX/RX circuit(s) 212 and/or packet marking circuit(s) 220 to enable the network endpoint 204 to provide a routing mark for a packet destined for the receiver. The routing mark can then be used by the receiving switch(es) 104 as part of routing the packet to the receiver.

As a more specific, but non-limiting example, the latency measurement circuit(s) 216 generates and transmits a plurality of probe packets that travel to the receiver via the multiple paths. Upon receiving responses to the probe packets, the latency measurement circuit analyzes a travel duration associated with each of the plurality of probe packets to measure the traffic on the network. In one example, a first probe packet among the plurality of probe packets may have traversed a first network path among the multiple paths and required a first duration to traverse the first network path. However, a second probe packet among the plurality of probe packets may have traversed a second network path among the multiple paths and required a second duration to traverse the second network path. In one scenario where the second duration is greater than the first duration, the second network path is identified as a path among the multiple paths to avoid in response to the latency measurement circuit(s) 216 determining that the second duration is greater than the first duration by a predetermined duration. In another scenario where the first duration exceeds an average duration required for the plurality of probe packets to reach the receiver by a predetermined duration, the first network path is identified as a path among the multiple paths to avoid in response to the latency measurement circuit(s) 216 determining that the first duration exceeds the average duration required for the plurality of probe packets to reach the receiver (e.g., by one standard deviation or more). As can be appreciated, the paths measured and analyzed by the latency measurement circuit(s) 220 may include one or more groups of switches 104 and/or switch ports 108. Thus, the latency measurement circuit(s) 216 may identify groups or sub-groups of switch ports 108 to traverse or avoid when routing a packet to a receiver.

Referring now to FIG. 6, additional details of a third method 600 will be described in accordance with at least some embodiments of the present disclosure. The method 600 may be performed in connection with methods 400 and/or 500 (e.g., as part of routing packet(s) through a network 304).

The method 600 begins by identifying at least one path between a sender and receiver as a path to avoid (step 604). The path to be avoided may be identified by one or more latency measurement circuits 216 of a network endpoint 204.

The method 600 continues with the latency measurement circuit(s) 216 continuing to measure the latency associated with the path to be avoided (step 608). Such measurements may occur while data packets are being transmitted to the receiver via other paths. Such measurements may also occur while other paths are having their respective latency measured.

The method 600 may continue when the latency measurement circuit(s) 216 determine that the path latency associated with the path to be avoided as returned back to acceptable limits (step 612). For instance, but without limitation, if the latency associated with the probe packet has returned to an average duration for other paths measured by other probe packets or the latency associated with the probe packet has come within a standard deviation of the average duration, then the step of 612 may be performed affirmatively.

The method 600 may then continue with the latency measurement circuit) s) 216 notifying the TX/RX circuit(s) 212 and/or packet marking circuit(s) 220 that the path is no longer required to be avoided (step 616). Depending upon the latency associated with the path, it may also be possible to change an indication associated with the path to express that the path is now a preferred path to the receiver.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network endpoint, comprising:
   a network interface that provides connectivity to a network;
   a latency measurement circuit to measure traffic on the network from a sender to a receiver across multiple paths; and
   a packet marking circuit to provide a routing mark for a packet destined for the receiver according to a network traffic measurement provided by the latency measurement circuit, wherein the routing mark provides an indication that supports routing for the packet to reach the receiver via a chosen path or subset of paths among the multiple paths, and wherein the routing mark provides an indication of a sub-group of switch ports to avoid when routing the packet to the receiver.

2. The network endpoint of claim 1, wherein the routing mark defines the chosen path or subset of paths for the packet to follow or another path in the multiple paths for the packet to avoid as the packet travels to the receiver, wherein the chosen path or subset of paths traverses one or more switches.

3. The network endpoint of claim 2, wherein the chosen path or subset of paths traverses a plurality of switches.

4. The network endpoint of claim 3, wherein the plurality of switches comprise at least one of a Top-of-Rack (ToR) switch and a spine switch.

5. The network endpoint of claim 2, wherein the chosen path or subset of paths is positively defined by the routing mark.

6. The network endpoint of claim 2, wherein the chosen path or subset of paths is defined by identifying the another in the multiple paths that are to be avoided.

7. The network endpoint of claim 1, wherein the latency measurement circuit generates and transmits a plurality of probe packets that travel to the receiver via the multiple paths, wherein the receiver returns the plurality of probe packets to the network endpoint, and wherein the latency measurement circuit analyzes a travel duration associated with each of the plurality of probe packets to measure the traffic on the network.

8. The network endpoint of claim 7, wherein a first probe packet among the plurality of probe packets traversed a first network path among the multiple paths and required a first duration to traverse the first network path, wherein a second probe packet among the plurality of probe packets traversed a second network path among the multiple paths and required a second duration to traverse the second network path, wherein the second duration is greater than the first duration, and wherein the second network path is identified as a path among the multiple paths to avoid in response to the latency measurement circuit determining that the second duration is greater than the first duration by a predetermined duration.

9. The network endpoint of claim 7, wherein a first probe packet among the plurality of probe packets traversed a first network path among the multiple paths and required a first duration to traverse the first network path, wherein the latency measurement circuit determines that the first duration exceeds an average duration required for the plurality of probe packets to reach the receiver by a predetermined duration, and wherein the first network path is identified as a path among the multiple paths to avoid in response to the latency measurement circuit determining that the first duration exceeds the average duration required for the plurality of probe packets to reach the receiver by a predetermined duration.

10. The network endpoint of claim 9, wherein the predetermined duration comprises at least one standard deviation in excess of the average duration.

11. The network endpoint of claim 9, wherein the latency measurement circuit determines that a second probe packet among the plurality of probe packets traversed the first network path in a duration less than the first duration and, in response thereto, notified the packet marking circuit that the first network path is no longer required to be avoided.

12. The network endpoint of claim 1, wherein the packet is part of a Remote Direct Memory Access (RDMA) packet flow.

13. A system, comprising:

a latency measurement circuit to measure traffic on a network from an endpoint sender to an endpoint receiver across multiple paths; and a packet marking circuit to provide a routing mark for a packet destined for the endpoint receiver according to a network traffic measurement provided by the latency measurement circuit, wherein the routing mark provides an indication that supports routing for the packet to reach the endpoint receiver via a chosen path or subset of paths among the multiple paths, and wherein the routing mark provides an indication of a sub-group of switch ports to avoid when routing the packet to the endpoint receiver.

14. The system of claim 13, further comprising a routing circuit to route the packet within the network according to the routing mark and wherein the latency measurement circuit generates and transmits a plurality of probe packets that travel to the endpoint receiver via the multiple paths, wherein the endpoint receiver returns the plurality of probe packets to the endpoint sender, and wherein the latency measurement circuit analyzes a travel duration associated with each of the plurality of probe packets to measure the traffic on the network.

15. The system of claim 14, wherein a first probe packet among the plurality of probe packets traversed a first network path among the multiple paths and required a first duration to traverse the first network path, wherein a second probe packet among the plurality of probe packets traversed a second network path among the multiple paths and required a second duration to traverse the second network path, wherein the second duration is greater than the first duration, and wherein the second network path is identified as a path among the multiple paths to avoid in response to the latency measurement circuit determining that the second duration is greater than the first duration by a predetermined duration.

16. The system of claim 14, wherein a first probe packet among the plurality of probe packets traversed a first network path among the multiple paths and required a first duration to traverse the first network path, wherein the latency measurement circuit determines that the first duration exceeds an average duration required for the plurality of probe packets to reach the endpoint receiver by a predetermined duration, and wherein the first network path is identified as a path among the multiple paths to avoid in response to the latency measurement circuit determining that the first duration exceeds the average duration required for the plurality of probe packets to reach the endpoint receiver by a predetermined duration.

17. The system of claim 16, wherein the predetermined duration comprises at least one standard deviation in excess of the average duration.

18. The system of claim 16, wherein the latency measurement circuit determines that a second probe packet among the plurality of probe packets traversed the first network path in a duration less than the first duration and, in response thereto, notified the packet marking circuit that the first network path is no longer required to be avoided.

19. The system of claim 13, wherein the chosen path or subset of paths traverses a plurality of switches.

20. The system of claim 13, wherein the packet is part of a Remote Direct Memory Access (RDMA) packet flow.

* * * * *